(12) United States Patent
Yamazawa

(10) Patent No.: US 9,568,719 B2
(45) Date of Patent: Feb. 14, 2017

(54) MICROSCOPE APPARATUS

(71) Applicant: OLYMPUS CORPORATION, Shibuya-ku, Tokyo (JP)

(72) Inventor: Yoshitsugu Yamazawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/717,690

(22) Filed: May 20, 2015

(65) Prior Publication Data

US 2015/0338626 A1 Nov. 26, 2015

(30) Foreign Application Priority Data

May 23, 2014 (JP) .................................. 2014-107395

(51) Int. Cl.
G02B 21/00 (2006.01)
G02B 21/26 (2006.01)
G02B 21/24 (2006.01)

(52) U.S. Cl.
CPC ........... *G02B 21/0008* (2013.01); *G02B 21/24* (2013.01); *G02B 21/26* (2013.01)

(58) Field of Classification Search
CPC ..... G02B 21/0008; G02B 21/26; G02B 21/34; G02B 21/0012; G02B 21/0016
USPC .................................. 359/368, 391, 380, 392
See application file for complete search history.

(56) References Cited

U.S. PATENT DOCUMENTS

| | | | | |
|---|---|---|---|---|
| 2,360,268 A | * | 10/1944 | Ott | ........................ G02B 21/241 359/382 |
| 5,844,714 A | * | 12/1998 | DiResta | ................. G02B 21/24 359/368 |
| 2005/0213200 A1 | * | 9/2005 | Gilbert | ................... G02B 21/24 359/368 |

FOREIGN PATENT DOCUMENTS

| | | |
|---|---|---|
| DE | 1761393 U | 2/1958 |
| EP | 1582905 A2 | 10/2005 |
| JP | 2011221104 A | 11/2011 |

OTHER PUBLICATIONS

Extended European Search Report dated Oct. 9, 2015, issued in counterpart European Application No. 15168901.5.
"Motic BA210 Microscope catalogue", Jun. 30, 2011, XP055217136, URL: http://www.motic.com/upload/File/20121022144202106.pdf.
"Motic BA50 and BA80 catalogue", Jun. 30, 2011, XP055217144, URL: http://citenpl.internal.epo.org/wf/storage/1501D4E987F0002CDC5/originalPdf.

* cited by examiner

*Primary Examiner* — Pascal M Bui-Pho
*Assistant Examiner* — Alberto Betancourt
(74) *Attorney, Agent, or Firm* — Holtz, Holtz & Volek PC

(57) ABSTRACT

A microscope apparatus includes a stage for holding a specimen, a stand portion for holding the stage, an arm portion having two arms extending from an upper part of the stand portion to a front side of the microscope apparatus, an optical system supported by the arm portion and configured to enlarge an image of the specimen on the stage, and gripping portions provided respectively on lower parts of the two arms and configured to be gripped by an observer.

4 Claims, 5 Drawing Sheets

MICROSCOPE APPARATUS

CROSS REFERENCES TO RELATED APPLICATIONS

This application is based upon and claims the benefit of priority from Japanese Patent Application No, 2014-107395, filed on May 23, 2014, the entire contents of which are incorporated herein by reference.

BACKGROUND

1. Technical Field

The disclosure relates to a microscope apparatus having an arm for supporting an optical system.

2. Related Art

Conventionally, microscope apparatuses having an objective lens, an eyepiece, a stage, a light source, or the like as basic components thereof have been manufactured in a variety of designs. In order to ensure observation of a clear image, it is necessary to enhance rigidity of a main body of the microscope apparatus. The main body is usually made of metal. Therefore, the microscope apparatus is heavy. When the microscope apparatus is moved by human power, the microscope apparatus may not be moved easily if it is difficult to hold the microscope apparatus.

As a technology to solve this situation, a microscope apparatus having a first holding unit and a second holding unit is disclosed (for example, refer to Japanese Laid-open Patent Publication No. 2011-221104). The first holding unit is arranged on a back side of a microscope main body and above the center of gravity of the microscope main body. The second holding unit is arranged so as to substantially face the first holding unit across the center of gravity.

In addition, a microscope is disclosed that has, on an interior surface of a microscope arm, a recessed portion configured to be gripped by an observer (for example, refer to U.S. Patent Application Publication No. 2005/0213200).

SUMMARY

In some embodiments, a microscope apparatus includes a stage for holding a specimen, a stand portion for holding the stage, an arm portion having two arms extending from an upper part of the stand portion to a front side of the microscope apparatus, an optical system supported by the arm portion and configured to enlarge an image of the specimen on the stage, and gripping portions provided respectively on lower parts of the two arms and configured to be gripped by an observer.

The above and other features, advantages and technical and industrial significance of this invention will be better understood by reading the following detailed description of presently preferred embodiments of the invention, when considered in connection with the accompanying drawings.

DETAILED DESCRIPTION

A microscope apparatus according to some embodiments of the invention will be described with reference to the drawings. The invention is not limited by the embodiments. The same reference signs are used to designate the same elements throughout the drawings. The drawings are schematic, and a relation between a thickness of each member and a width thereof, a ratio between the members, and the like are different from those in reality. A size of each member and the ratio between the members may be different among the drawings.

Figure 1:
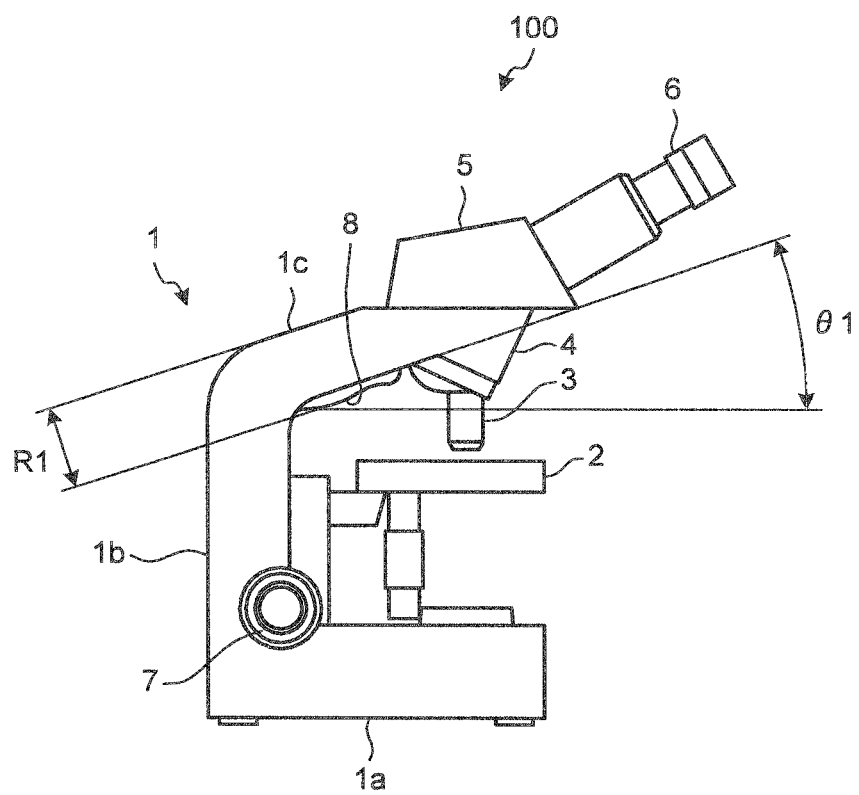
FIG. 1 is a side view illustrating a schematic configuration of an upright microscope apparatus according to some embodiments of the invention.
Figure 2:
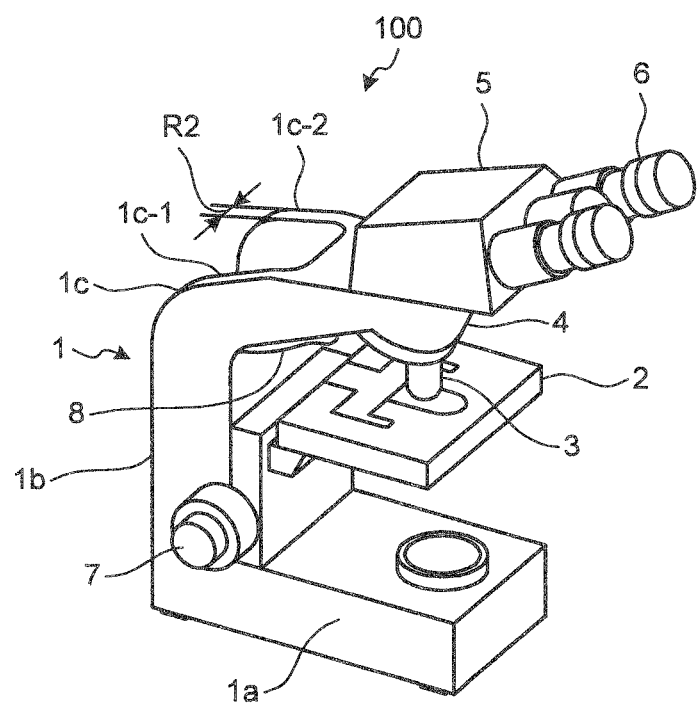
FIG. 2 is a perspective view of the upright microscope apparatus in FIG. 1 as seen from a front upper left side thereof.
Figure 3:
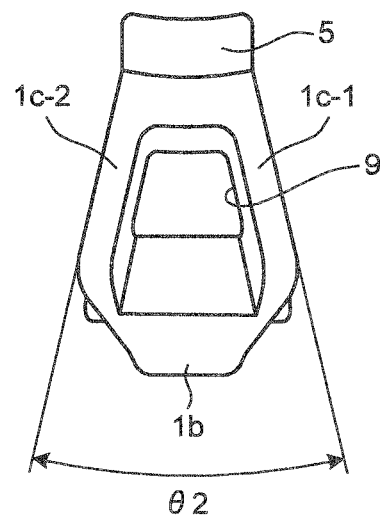
FIG. 3 is an enlarged back view of an arm portion of the upright microscope apparatus in FIG. 1.

FIG. 1 is a side view illustrating a schematic configuration of an upright microscope apparatus according to some embodiments of the present invention. FIG. 2 is a perspective view of the upright microscope apparatus in FIG. 1 as seen from a front upper left side thereof. FIG. 3 is an enlarged back view of an arm portion of the upright microscope apparatus in FIG. 1. In some embodiments, the upright microscope will be exemplified, in which a specimen is irradiated with illumination light from a lower part of a stage, and an image which has passed through the specimen is enlarged and observed with an objective lens held by the arm portion. As long as the arm portion of the microscope holds an optical system, the microscope is not limited to the upright microscope. In this description, a front side of the microscope apparatus refers to a location where an observer of the microscope apparatus is located for observation, and a back side of the microscope apparatus refers to a location opposite to the front side.

In a microscope apparatus 100, a microscope main body 1 includes a stage 2, a revolver 4, and a lens-barrel 5. The microscope main body 1 is a casing to support constituting members of the microscope apparatus 100 and is constituted by combining parts made of an aluminum alloy or the like, and a plastic material. The microscope main body 1 includes a base portion 1a, a stand portion 1b, and an arm portion 1c. The base portion 1a includes a built-in illumination optical system (not illustrated). The stand portion 1b holds the stage 2. The arm portion 1c extends from the stand portion 1b to the front side of the microscope apparatus 100, and holds the revolver 4 and the lens-barrel 5.

The lens-barrel 5 is detachably mounted on an upper surface of the arm portion 1c, and includes two eyepieces 6. The lens-barrel 5 is mounted such that the eyepieces 6 are on the front side of the microscope apparatus 100 during observation. However, the lens-barrel 5 is turnable, and is turned such that the eyepieces 6 face the back side of the microscope apparatus 100. It is possible to observe or house a specimen from the back side.

The revolver 4 is mounted on a lower surface of the arm portion 1c and a plurality of objective lenses 3 having different magnifications is detachably mounted on the revolver 4.

As described above, in the microscope apparatus 100, the specimen is placed on the stage 2, the revolver 4 is operated to make the objective lens 3 face the specimen, and the eyepieces 6 is focused while a focusing handle 7 rotated in order to observe an image of the specimen.

The arm portion 1c includes two arms, i.e., an arm 1c-1 and an arm 1c-2 extending from an upper part of the stand portion 1b to the front side of the microscope apparatus 100. On lower surfaces of the two arms 1c-1 and 1c-2, gripping portions 8 are respectively provided that are configured to be gripped by the observer. As illustrated in FIG. 3, an aperture 9 is formed with the arms 1c-1 and 1c-2. When observing the specimen from the back side of the microscope apparatus 100, the observer can visually recognize the objective lens 3 and the specimen on the stage 2 through the aperture 9.

Each of the arms 1c-1 and 1c-2 preferably has a length R1 in the thickness direction of 50 to 60 mm, and a length R2 in the width direction of 20 to 30 mm in accordance with a general size of hands of an observer. The length R1 of each of the arms 1c-1 and 1c-2 in the thickness direction includes a thickness of the gripping portion 8 described later.

The arm portion 1c is formed such that an angle $\theta 1$ between the arm portion 1c and an upper, surface of the stage 2 is 10 to 30°, preferably 20 to 30°. If the arm portion 1c extends approximately parallel to the upper surface of the stage 2, a burden may be applied to the wrist of the observer when the microscope is carried with the arms of the observer bent. When the microscope is carried with the arms of the observer stretched to prevent a burden from being applied to the wrist, the observer may be hit on the foot when moving. In addition, when the extending angle is larger than 30°, a burden applied to the index finger may be increased by a pressure from a protrusion of the gripping portion 8 described later, and a pain may be caused to the index finger.

An angle $\theta 2$ between the arms 1c-1 and 1c-2 is 10 to 30°, preferably 20 to 30°. By setting the angle $\theta 2$ between the arms 1c-1 and 1c-2 to 10 to 30°, the observer can grip the microscope naturally without bending his/her both arms.

Figure 4:
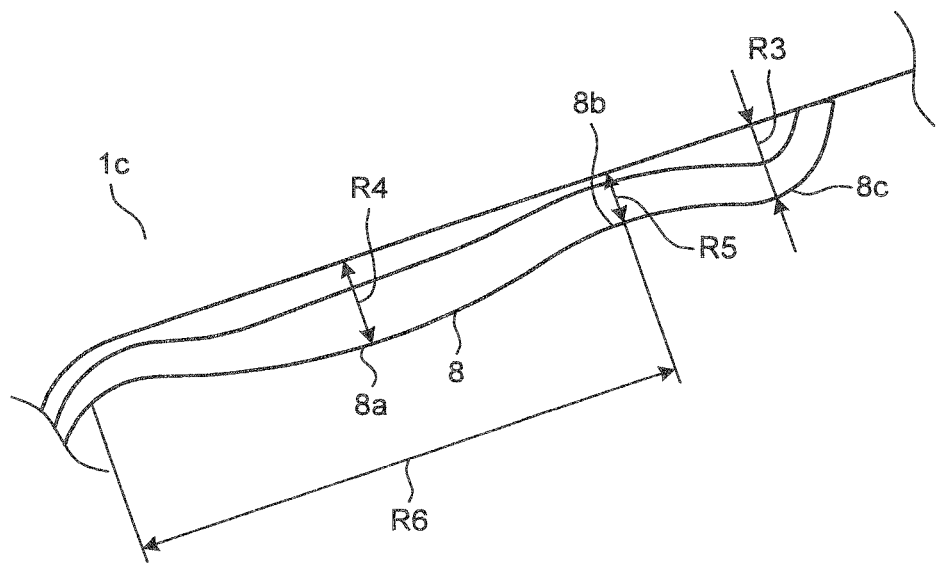
FIG. 4 is an enlarged side view of gripping portions the upright microscope apparatus in FIG. 1.

Next, reference will be made to the gripping portions 8 provided on lower parts of the two arms 1c-1 and 1c-2. FIG. 4 is an enlarged side view of the gripping portions 8 of the microscope apparatus 100 in FIG. 1. As illustrated in FIG. 4, the gripping portion 8 has a smooth uneven shape along the extending direction of the arm portion 1c. The gripping portion 8 includes a grip 8a, a recess 8b, and a protrusion 8c. The observer grips the gripping portion 8 so as to wrap the grip 8a with his/her fingers. The gripping portion 8 includes the protrusion 8c on the side of the revolver 4. Therefore, when the observer tries to hold the gripping portion 8, his/her index finger does not reach the side of the objective lens 3 due to the protrusion 8c, and the observer grips the vicinity of the recess 8b. In this way, the finger does not come into contact with the objective lens 3, and the objective lens 3 is free from being stained. In some embodiments, the grip 8a includes one protrusion. However, the grip 8a may include a plurality of recesses and protrusions in accordance with bent fingers.

A maximum height R3 of the grip 8a from the arm portion is preferably about 6 to 10 mm. A height R4 of the protrusion 8c from the arm portion 1c is preferably about 7 to 11 mm. A height R5 of the recess 8b from the arm portion 1c is preferably about 7 to 10 mm. A length R6 of the grip 8a is preferably about 50 to 60 mm.

If the arm portion 1c is made of a plastic material, the gripping portions 8 may be made of the same plastic material or another elastic material. By making the gripping portions 8 of an elastic material such as rubber, the gripping portions 8 fit to the hands of the observer to cause the gripping portions 8 to be easily gripped and reduce the burden of the observer. The gripping portions 8 are preferably colored with a different color from the arm portion 1c. By coloring the gripping portions 8 with a different color from the arm portion 1c, it is possible to recognize the gripping portions 8 not only with the shape but also with the color, and it is possible to reduce occurrence of an accident or the like caused by holding an incorrect portion.

Figure 5A:
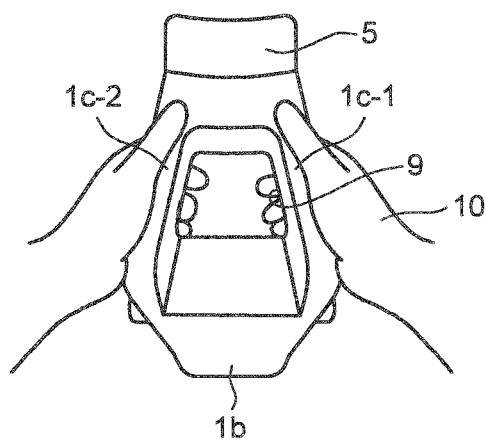
FIG. 5A is an enlarged back view of the gripping portions gripped by an observer.
Figure 5B:
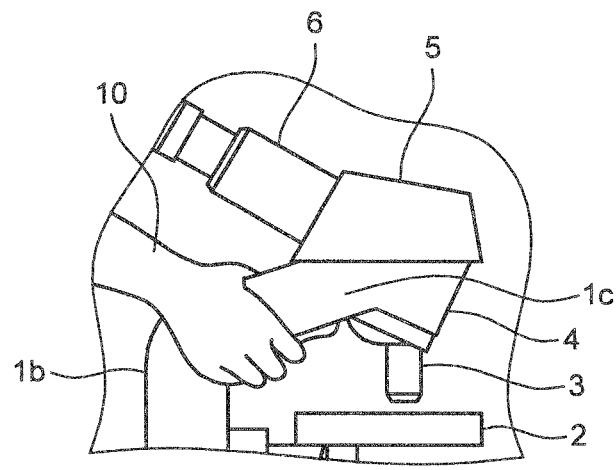
FIG. 5B is an enlarged side view of the gripping portions gripped by the observer.
Figure 5C:
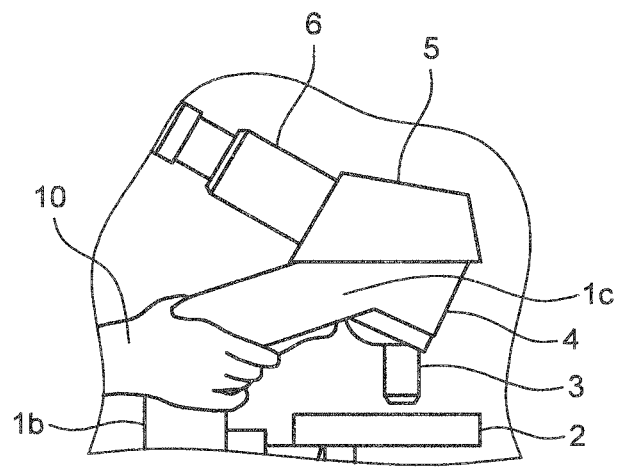
FIG. 5C is an enlarged side view exemplifying gripping by the observer when the observer lifts up the microscope apparatus.

A case where the observer grips the gripping portion 8 will be exemplified with reference to the drawings. FIG. 5A is an enlarged back view of the vicinity of the gripping portion gripped by the observer. FIG. 5B is an enlarged side view of the vicinity of the gripping portion gripped by the observer. FIG. 5C is an enlarged side view exemplifying gripping by the observer when the observer lifts up the microscope apparatus. Note that the lens-barrel 5 is turned to the back side of the microscope apparatus 100 in FIGS. 5B and 5C.

As illustrated in FIG. 5A, an observer 10 grips the two arms 1c-1 and 1c-2 from the back side of the microscope apparatus 100. As illustrated in FIG. 5B, when gripping the arms 1c-1 and 1c-2, the observer 10 grips the arms 1c-1 and 1c-2 so as to wrap the grip 8a with his/her fingers. The protrusion 8c is arranged at a position closer to the objective lens 3 than the grip 8a. Therefore, the finger does not reach the side of the objective lens 3, or even when gripping the vicinity of the protrusion Sc by mistake, the observer 10 can grip the grip 8a which is an appropriate gripping part, due to a sense of touch when gripping.

When the microscope apparatus 100 is moved horizontally, as illustrated in FIGS. 5A and 5B, the microscope apparatus 100 can be moved by gripping the gripping portion 8. However, when the microscope apparatus 100 is lifted up to a higher place, as illustrated in FIG. 5C, if a bent part, which is a little closer to the back side than the usual grip 8a and is at the boundary between the stand portion 1b and the arm portion 1c, is gripped, a burden applied to the arm when the microscope apparatus 100 is lifted up can be reduced.

The microscope apparatus according to some embodiments has the gripping portions which are respectively provided on the two arms of the arm portion and are visually recognized easily by an observer. With this structure, it is possible to safely carry the microscope apparatus.

As described above, the microscope apparatus according to some embodiments is useful for a small portable microscope apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus comprising:
   a stage for holding a specimen;
   a stand portion for holding the stage;
   an arm portion having two arms extending from an upper part of the stand portion to a front side of the microscope apparatus, wherein the two arms define an aperture therebetween;
   an optical system supported by the arm portion and configured to enlarge an image of the specimen on the stage; and
   two gripping portions provided respectively on lower parts of the two arms and configured to be gripped by an observer, wherein an angle between the two arms is 10° to 30°, and
wherein the two arms are disposed above the stage and extend such that an angle between an upper surface of the stage and the two arms is 10° to 30°.

2. The microscope apparatus according to claim 1, wherein each of the two gripping portions has a smooth uneven shape along an extending direction of a corresponding arm.

3. The microscope apparatus according to claim 1, wherein each of the two gripping portions is made of an elastic material and colored with a color that is different from a color of the arm portion.

4. The microscope apparatus according to claim 1, wherein each of the two gripping portions has at least one protrusion at an end thereof on a side of the optical system in an extending direction of a corresponding arm.

* * * * *